United States Patent
Shim et al.

(10) Patent No.: US 11,233,626 B2
(45) Date of Patent: Jan. 25, 2022

(54) UPLINK TRANSMISSION METHOD AND DEVICE IN TIME-DIVISION DUPLEX COMMUNICATION SYSTEM

(71) Applicant: SEOUL NATIONAL UNIVERSITY R&DB FOUNDATION, Seoul (KR)

(72) Inventors: Byonghyo Shim, Seoul (KR); Wonjun Kim, Seoul (KR); Hyoungju Ji, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 38 days.

(21) Appl. No.: 16/755,360

(22) PCT Filed: Nov. 22, 2017

(86) PCT No.: PCT/KR2017/013353
§ 371 (c)(1),
(2) Date: Jul. 14, 2020

(87) PCT Pub. No.: WO2019/074157
PCT Pub. Date: Apr. 18, 2019

(65) Prior Publication Data
US 2021/0143971 A1   May 13, 2021

(30) Foreign Application Priority Data
Oct. 11, 2017  (KR) .......................... 10-2017-0130377

(51) Int. Cl.
*H04W 4/00*   (2018.01)
*H04L 5/14*   (2006.01)
*H04L 25/02*  (2006.01)

(52) U.S. Cl.
CPC .......... *H04L 5/1469* (2013.01); *H04L 25/022* (2013.01); *H04L 25/0242* (2013.01)

(58) Field of Classification Search
None
See application file for complete search history.

(56) References Cited

U.S. PATENT DOCUMENTS

| 9,256,578 B2 | 2/2016 | Wu et al. |
| 9,401,826 B2 | 7/2016 | Eitel et al. |

(Continued)

FOREIGN PATENT DOCUMENTS

| KR | 10-2013-0095216 A | 8/2013 |
| KR | 10-2013-0122779 A | 11/2013 |

(Continued)

OTHER PUBLICATIONS

PCT International Search Report, PCT/KR2017/013353, dated Jul. 6, 2018, 4 Pages.

(Continued)

*Primary Examiner* — Clemence S Han
(74) *Attorney, Agent, or Firm* — Fenwick & West LLP (57) ABSTRACT

An operation method of a base station in a time division duplex communication system includes: a step for setting a time period in which a terminal can transmit an uplink in a downlink period; a step for generating a sparse vector signal including information about the time period; and a step for transmitting the sparse vector signal to the terminal. In addition, an operation method of the terminal in the time division duplex communication system includes: a step for receiving a part of a sparse vector signal from the base station; a step for recovering the received sparse vector signal by compressed sensing; and a step for transmitting uplink data in a time period instructed in a downlink period based on the basis of the recovered signal.

12 Claims, 6 Drawing Sheets

(56) References Cited

U.S. PATENT DOCUMENTS

| | | | |
|---|---|---|---|
| 2011/0286498 A1* | 11/2011 | Abrishamkar | H04L 25/0234 375/148 |
| 2013/0215945 A1 | 8/2013 | Eitel et al. | |
| 2013/0289942 A1 | 10/2013 | Wu et al. | |
| 2015/0003542 A1* | 1/2015 | Barbu | H04L 25/0218 375/260 |
| 2015/0131704 A1* | 5/2015 | Furudate | H04L 25/0228 375/136 |
| 2016/0248611 A1* | 8/2016 | Rapoport | H04L 25/03987 |
| 2017/0048735 A1* | 2/2017 | Rao | H04L 5/0048 |
| 2017/0126437 A1* | 5/2017 | Truong | H04L 25/0202 |
| 2018/0014320 A1* | 1/2018 | Xu | H04W 72/04 |
| 2018/0131548 A1* | 5/2018 | Al-Abbasi | H04L 25/03019 |
| 2018/0160326 A1* | 6/2018 | Lin | H04L 5/0048 |
| 2018/0351600 A1* | 12/2018 | Kang | H04J 13/00 |
| 2019/0098622 A1* | 3/2019 | Lee | H04W 72/0446 |
| 2019/0253923 A1* | 8/2019 | Kang | H04W 28/06 |
| 2020/0163058 A1* | 5/2020 | Lee | H04L 5/0014 |

FOREIGN PATENT DOCUMENTS

| | | |
|---|---|---|
| KR | 10-1352618 B1 | 1/2014 |
| WO | WO 2016-199989 A1 | 12/2016 |

OTHER PUBLICATIONS

Sharp, "Processing Time Reduction for TDD with 1-slot sTTI," Nov. 4, 2016, R1-1612619, 3GPP TSG RAN WGI Meeting #87, Reno, USA.

* cited by examiner

UPLINK TRANSMISSION METHOD AND DEVICE IN TIME-DIVISION DUPLEX COMMUNICATION SYSTEM

DESCRIPTION OF GOVERNMENT-FUNDED RESEARCH AND DEVELOPMENT

This research is conducted by Industry-Academic Cooperation Foundation, Yonsei University, and funded by Information Communication Technology Promotion Center, the Ministry of Science and ICT (Broadcasting and communications industry technology development, Frequency sensing based spectrum management and future radio communication platform research, Project serial number: 1711056590).

TECHNICAL FIELD

The present disclosure relates to an device and method for uplink transmission in time division duplex (TDD) systems, and more particularly, to an uplink transmission device and method for enabling ultra-reliable and low latency communications (URLLC) in TDD systems.

BACKGROUND ART

With the development of wireless communication technology, there is the growing interest in ultra-reliable and low latency communications (URLLC) for use in real-time, virtual reality, unmanned system and factory automation system applications. Particularly, URLLC is one of essential services in 5th generation (5G), and failure-free transmission and minimized transmission latency are required.

The wireless communication technology has been developed based on frequency division duplex (FDD) in which uplink and downlink are separated by the frequency range, but as the usable frequencies decrease, there is an increasing need for frequency utilization in a time division manner.

A time division duplex (TDD) system divides resources by time and transmits data using the resource, and basically, downlink and uplink data transmission is performed using downlink and uplink resources, respectively. Accordingly, when data to transmit and the current link direction do not match, a base station or a terminal needs the waiting time to the resource in the matched link direction.

Additionally, according to the existing scheduling technique, the terminal transmits a resource allocation request (scheduling request) to the base station to transmit generated data, and the base station completes a resource allocation (uplink grant) process, causing considerable latency.

DISCLOSURE

Technical Problem

The present disclosure is directed to providing a method and device for uplink transmission, in which a base station allocates a time period for uplink transmission in the downlink period, and processing latency and scheduling latency is reduced using compressed sensing, to enable ultra-reliable and low latency communications in time division duplex systems.

Technical Solution

To achieve the above-described object, according to an aspect of the present disclosure, there is provided an operation method of a base station in a time division duplex (TDD) system, the method including setting a time period for uplink transmission of a terminal in a downlink period, generating a sparse vector signal including information of the time period, and transmitting the sparse vector signal to the terminal.

According to an embodiment of the present disclosure, generating the sparse vector signal may include selecting at least one subcarrier based on channel information, and generating the sparse vector signal including information of the selected subcarrier.

According to an embodiment of the present disclosure, selecting the subcarrier may include selecting the subcarrier as much as sparsity based on the channel information acquired via uplink channel estimation.

According to an embodiment of the present disclosure, selecting the subcarrier as much as the sparsity may include determining an index of a subcarrier having a highest channel gain, generating a set of indexes of a column vector having an orthogonal relationship with a column vector corresponding to the index in a sensing matrix, and selecting the subcarrier as much as the sparsity in a descending order of channel gain from the set to constitute a support.

According to an embodiment of the present disclosure, the selected subcarrier may indicate the terminal allocated for uplink transmission in the time period.

According to another aspect of the present disclosure, there is provided an operation method of a terminal in a TDD system, the method including receiving part of a sparse vector signal from a base station, recovering the received sparse vector signal by compressed sensing, and transmitting uplink data in an indicated time period within a downlink period based on the recovered signal.

According to an embodiment of the present disclosure, recovering by the compressed sensing may include a support recovering step of recovering the received sparse vector signal using a sensing matrix, and a sparse vector estimation step of recovering the support recovered signal based on channel information.

According to an embodiment of the present disclosure, the terminal may determine if the time period is allocated to the terminal based on the support recovery.

According to an embodiment of the present disclosure, the support recovered signal may indicate at least one subcarrier selected by the base station, and the terminal may determine if the time period is allocated to the terminal based on the indicated subcarrier.

According to still another aspect of the present disclosure, there is provided a base station device in a TDD system, the base station device including at least one processor to set a time period for uplink transmission of a terminal in a downlink period, and generate a sparse vector signal including information of the time period, and a transceiver to transmit the sparse vector signal.

According to yet another aspect of the present disclosure, there is provided a terminal device in a TDD system, the terminal device including a transceiver to receive part of a sparse vector signal from a base station, and at least one processor to recover the received sparse vector signal by compressed sensing, wherein the transceiver transmits uplink data in an indicated time period within a downlink period based on the recovered signal.

Advantageous Effects

The method and device according to various embodiments of the present disclosure allocates a time period for uplink transmission in the downlink period to reduce the waiting time for uplink. Additionally, it is possible to reduce latency necessary for scheduling and processing latency using the compressed sensing technique that recovers a transmitted signal using a small number of measurements. Through this, it is possible to enable ultra-reliable and low latency communications in time division duplex systems.

The effects that can be obtained from the present disclosure are not limited to the above-mentioned effects, and other effects not mentioned herein will be clearly understood by those skilled in the art from the following description.

BEST MODE

These and other advantages and features of the present disclosure and methods for achieving them will be apparent by referring to the embodiments described in detail below together with the accompanying drawings. However, the present disclosure is not limited to the following disclosed embodiments and will be embodied in many different forms, and these embodiments are only provided to make the disclosure complete and help those having ordinary skill in the technical field pertaining to the present disclosure to understand the scope of the invention fully, and the present disclosure is only defined by the scope of the appended claims. Like reference numerals indicate like elements throughout the specification.

In describing the embodiments of the present disclosure, when it is determined that a certain detailed description of known functions or elements makes the key subject matter of the present disclosure unnecessarily ambiguous, the detailed description will be omitted herein, and the terms as used herein are defined in consideration of functions in the embodiments of the present disclosure and may vary depending on the intention of users or operators or the convention. Therefore, the definition should be made based on the context throughout the specification.

Combinations of each block of the accompanying block diagram and each step of the accompanying flowchart may be performed by computer program instructions (an execution engine), and the computer program instructions may be mounted in a processor of a general-purpose computer, a special computer or other programmable data processing device, and the instructions executed through the processor of the computer or other programmable data processing device generate means for performing functions described in each block of the block diagram or each step of the flowchart.

The computer program instructions may be stored in computer-enabled or computer-readable memory for the computer or other programmable data processing device to implement the function by a particular method, and the instructions stored in the computer-enabled or computer-readable memory may produce an item having embedded instruction means for performing the function described in each block of the block diagram or each step of the flowchart.

Additionally, the computer program instructions may be mounted on the computer or other programmable data processing device, and the instructions for generating a process that is performed by the computer by performing a series of operation steps on the computer or other programmable data processing device to operate the computer or other programmable data processing device may provide steps for performing the functions described in each block of the block diagram and each step of the flowchart.

Additionally, each block or each step may represent part of a module, a segment or code including at least one executable instructions for performing specified logical functions, and in some alternative embodiments, it should be noted that the functions mentioned in the blocks or steps may take place out of order. For example, two successive blocks or steps may be substantially performed at the same time, and the blocks or steps may be performed in a reverse order of the corresponding function if necessary.

Hereinafter, the embodiments of the present disclosure will be described in detail with reference to the accompanying drawings. However, the following exemplary embodiments of the present disclosure may be embodied in many different forms, and the scope of the present disclosure is not limited to the below-described embodiment. The embodiments of the present disclosure are provided to explain the present disclosure to those skilled in the art fully and completely.

Figure 1:
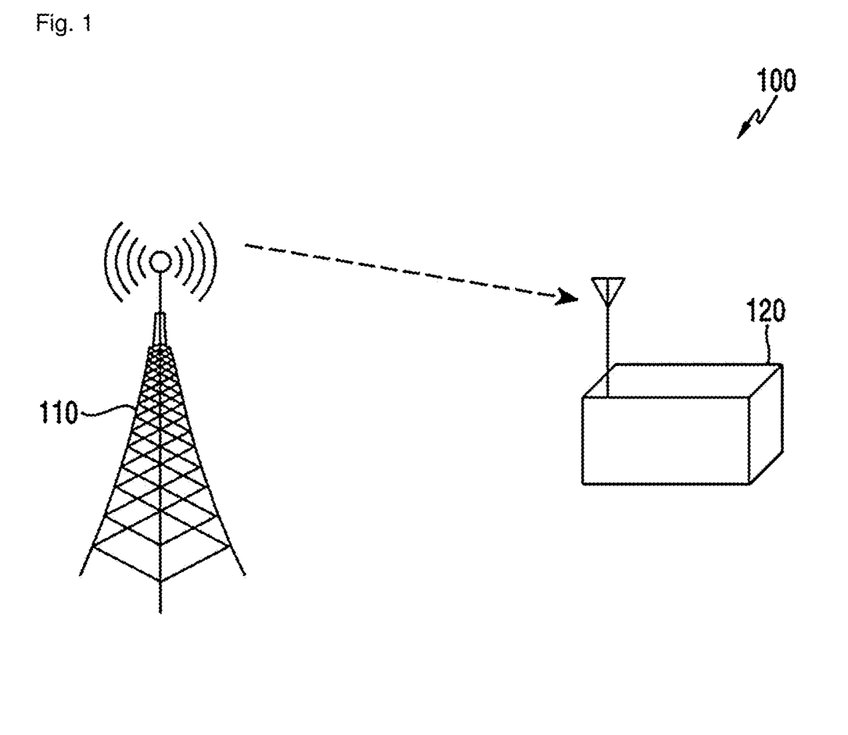
FIG. 1 shows a wireless communication system according to an embodiment of the present disclosure.

FIG. 1 shows a wireless communication system according to an embodiment of the present disclosure.

Referring to FIG. 1, the wireless communication system 100 according to an embodiment of the present disclosure includes a base station 110 and a terminal 120.

The base station 110 may be interchangeably used with an "access point (AP)", "eNodeB" or "eNB", and a transmission reception point (TRP) according to the type of network. Hereinafter, for convenience, the base station 110 may be used herein to indicate network infrastructure components that provide remote terminals with wireless access.

In some embodiments, the terminal 120 may be an electronic device that provides mobility. The terminal 120 may receive data from the base station 110, or may receive control information for the data. The control information may include information about downlink scheduling, and information about resources used for uplink transmission of the terminal, uplink scheduling grant, and hybrid automatic repeat request (HARQ) acknowledgment (ACK). The terminal 120 may be used in other well-known terms such as "user equipment (UE)", "mobile station", "subscriber station", "remote terminal", "wireless terminal", or "user device" according to the type of network.

The present disclosure will provide a detailed description of a process in which the base station 110 allocates an instant minislot, or a time period for uplink transmission, to the terminal 120, and uplink data is transmitted in the downlink period. The terminal may use the compressed sensing technique to decode instant minislot allocation information. Hereinafter, FIGS. 2 to 6 describe the operation of the base station 110 and the terminal 120 for reducing uplink transmission latency in time division duplex (TDD) systems based on orthogonal frequency division multiplexing (OFDM) for convenience of description, but the present disclosure is not limited thereto.

For ultra low latency uplink data transmission of the present disclosure, the base station 110 needs to allocate a time period for uplink transmission even in a downlink situation, and indicate a quick access to uplink resources allocated in a small amount to the terminal. In the case of the signal processing technique used in the existing signaling method, there are problems in attaining the low latency requirement due to largely two features. First, the existing decoding process is performed after the receiver receives all signals transmitted by the transmitter. Additionally, in OFDM, the receiver measures all signals and decodes via fast Fourier transform and demodulation. Due to these two features, with the increasing length of a signal, processing latency increases. To solve this problem, the present disclosure proposes generating and transmitting a sparse vector signal based on the compressed sensing technique for a signaling method.

Hereinafter, the proposed signaling and data transmission method based on compressed sensing is shown with reference to FIGS. 2 to 6.

Figure 2:
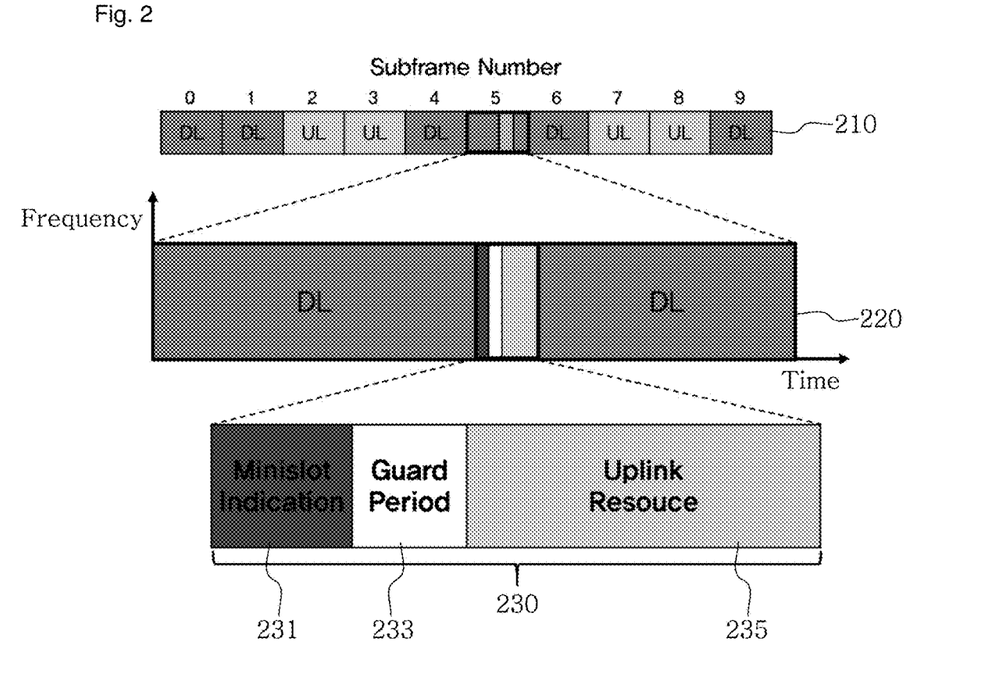
FIG. 2 shows an example of the structure of downlink and uplink transmission resources by time in a time division duplex system according to an embodiment of the present disclosure.

FIG. 2 shows an example of the structure of downlink and uplink transmission resources by time in a TDD system according to an embodiment of the present disclosure.

As shown in FIG. 2, the general TDD system allocates and uses downlink and uplink by time. That is, in general, resources are allocated to transmit uplink or downlink data for each subframe. Referring to FIG. 2, a frame 210 according to an embodiment of the present disclosure may be differently allocated with downlink or uplink resources for each subframe, or may be allocated with downlink or uplink resources in at least two or three successive subframes.

A subframe 220 according to an embodiment may be allocated with the resources of frequency and time domains as shown in FIG. 2. For example, the subframe 220 may be a subframe allocated for downlink in the frame 210.

According to an embodiment of the present disclosure, the base station 110 may allocate an instant minislot 230 in the subframe 220 for ultra low latency uplink data transmission. The subframe 220 is a downlink period for data transmission from the base station 110 to the terminal 120, and thus according to the existing scheme, although there is uplink data to transmit to the base station, the terminal 120 needs the waiting time to arrival of the uplink period (subframe #7 in the frame 210), causing transmission latency. When the base station 110 allocates the instant minislot 230, the terminal 120 may transmit uplink data through the instant minislot 230, thereby reducing transmission latency. That is, the instant minislot refers to a time period for signaling and uplink transmission, set for uplink transmission of the terminal in the downlink period.

Referring to FIG. 2, the instant minislot 230 includes a minislot indication period 231, a guard period 233, and an uplink resource period 235.

The minislot indication period 231 is a resource used for signaling between the base station 110 and the terminal 120. According to an embodiment of the present disclosure, to reduce scheduling latency other than the waiting time and minimize the influence on downlink transmission quality, it is necessary to reduce the resources necessary for the minislot indication period 231 as possible. As such, to reduce the resources necessary for the minislot indication period 231, the compressed sensing technique may be used for the terminal 120 to recover a transmitted signal using a small number of measurements as described below.

The guard period 233 refers to a buffer resource period necessary for the terminal 120 to recover a received signal to decode allocated resource information. According to an embodiment of the present disclosure, the guard period 233 may be set to a small period of time enough to reduce latency, and at the same time, may be allocated with a sufficient period of time for the terminal 120 to recover a signal using the compressed sensing technique and prepare for uplink transmission.

The uplink resource period 235 refers to a resource period for uplink transmission allocated from the base station 110 to the terminal 120. According to an embodiment of the present disclosure, the terminal 120 may decode information of the uplink resource period 235 from a received signal, and transmit uplink data to the base station 110 through the uplink resource period 235.

Figure 3:
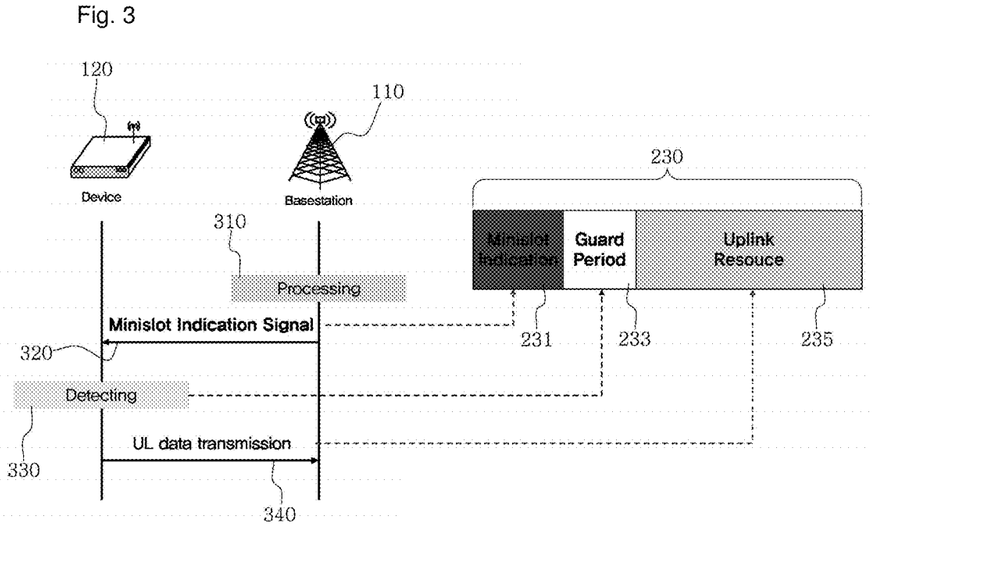
FIG. 3 shows a signaling flow for instant minislot allocation between a base station and a terminal according to an embodiment of the present disclosure.

FIG. 3 shows a signaling flow for instant minislot allocation between the base station and the terminal according to an embodiment of the present disclosure.

When the base station 110 allocates the instant minislot 230, the base station 110 transmits related information to the terminal 120. Accordingly, a signaling transmission process between the base station 110 and the terminal 120 is necessary.

As shown in FIG. 3, the signaling transmission process between the base station 110 and the terminal 120 includes a process for allocation processing of an instant minislot 230 (310), a process for transmission of a minislot indication signal (320), a process for allocated resource detection (330), and a process for uplink data transmission (340).

Referring to FIG. 3, the base station 110 performs a process for allocation processing of an instant minislot 230 (310). According to an embodiment of the present disclosure, the base station 110 may allocate the instant minislot 230 to allow uplink transmission of the terminal 120 in the downlink period.

Subsequently, the base station 110 performs a process for transmission of a minislot indication signal carrying allocation information for the uplink resource period (320). According to an embodiment of the present disclosure, as the terminal 120 decodes the received signal using the compressed sensing technique to minimize scheduling latency, the terminal 120 may only receive a small number of measurements, not all minislot indication signals. To this end, the base station may transmit a sparse signal by ultra-short indication signaling.

Subsequently, the terminal 120 a process for allocated resource detection by decoding the received signal (330). According to an embodiment of the present disclosure, the terminal 120 may use the compressed sensing technique to recover the original sparse signal using the small number of received measurements. The terminal 120 may only receive the small number of measurements, not all signals, recover the original transmitted minislot indication signal, and acquire allocated resource information. The process for allocated resource detection (330) may be designed to be performed in the guard period 233.

Finally, the terminal 120 performs a process for uplink data transmission to the base station 110 (340). According to an embodiment of the present disclosure, the terminal 120 may identify the resource information acquired from the signal recovered through the compressed sensing technique, and transmit uplink data to the base station 110 in the corresponding resource period.

As described above, the terminal 120 may transmit uplink data using the uplink resource period 235 allocated in the downlink period by the base station, thereby reducing uplink data transmission latency, and as a consequence, achieving ultra low latency communications.

Figure 4:
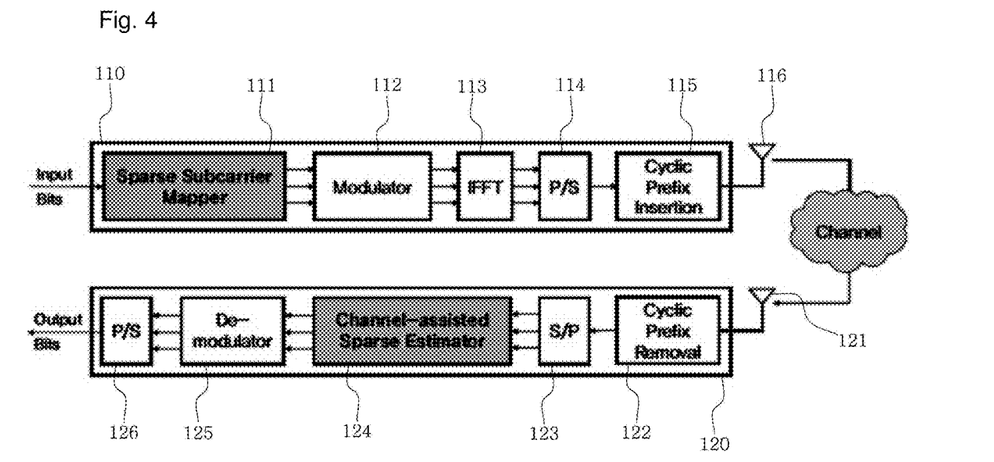
FIG. 4 is a high-level diagram of orthogonal frequency division multiplexing (OFDM) TX/RX paths according to an embodiment of the present disclosure.

FIG. 4 is a high-level diagram of OFDM TX/RX paths when the base station 110 and the terminal 120 according to an embodiment of the present disclosure are implemented in OFDM.

Referring to FIG. 4, shown are an OFDM TX path in which the base station 110 generates and transmits a minislot indication signal, and an OFDM RX path in which the terminal 120 recovers a received signal via compressed sensing.

According to an embodiment, the TX path of the base station 110 may include a modulator 112, an inverse fast Fourier transform (IFFT) block 113, a parallel-to-serial (P/S) converter 114, a Cyclic Prefix Insertion block 115, and an antenna 116. Additionally, the RX path of the terminal 120 may include an antenna 121, a Cyclic Prefix Removal block 122, a serial-to-parallel (S/P) converter 123, a demodulator 125 and a P/S converter 126.

At least some of the components of FIG. 4 may be implemented in software, and other components may be implemented by configurable hardware or a combination of software and configurable hardware. For example, the TX path of the base station 110 may be, in whole or in part, implemented by a transmitter or a transceiver, and the RX path of the terminal 120 may be, in whole or in part, implemented by a receiver or a transceiver. Particularly, the FFT block and the IFFT block described herein may be implemented as configurable software algorithms depending on the implementation, and here, a value of size N may change depending on the implementation.

In the base station 110, the modulator 112 receives a set of information bits, applies encoding (for example, LDPC encoding), and modulates the information bits (for example, QPSK, QAM) to generate a sequence of frequency domain modulated symbols. The IFFT block 113 of size N performs the IFFT operation on N parallel symbol streams to generate output signals on the time domain. The P/S converter 114 converts (i.e., multiplexes) parallel output symbols on the time domain from the IFFT block 113 of size N to generate serial signals on the time domain. The Cyclic Prefix Insertion block 115 inserts the cyclic prefix into the signal on the time domain. For transmission via a radio channel, the signal having the inserted cyclic prefix may be modulated (i.e., up-converted) into RF frequency through an up-converter (not shown). Prior to the conversion into RF frequency, baseband filtering may be performed. The antenna 116 may have an antenna array structure including a set of at least one antenna, and support transmit beamforming.

The RF signal transmitted through the antenna 116 arrives at the terminal 120 via the radio channel, and reverse operations of the operations of at the base station 110 are performed. The antenna 121 may have an antenna array structure including a set of at least one antenna, and may support receive beamforming. A down-converter (not shown) may down-convert the received signal into baseband frequency. The Cyclic Prefix Removal block 122 removes the cyclic prefix to generate serial baseband signals on the time domain. The S/P converter 123 converts the baseband signals on the time domain into parallel signals on the time domain. Although not shown in FIG. 4, N FFT blocks may be further provided to generate N parallel signals on the frequency domain by performing a size FFT algorithm. The demodulator 125 may demodulate and decode the modulated symbols, and the P/S converter 126 converts the demodulated parallel signals into a data stream.

According to an embodiment of the present disclosure, the base station 110 generates and transmits a minislot indication signal, and the terminal 120 recovers the original indication signal using a small number of measurements based on compressed sensing, and thus the base station 110 needs to sparsely generate and transmit a signal. Accordingly, as shown in FIG. 4, the base station 110 may further include a sparse subscriber mapper 111 in the TX path to generate a sparse vector. For example, the base station 110 may include at least one processor, and the function of the sparse subscriber mapper 111 may be performed by the at least one processor.

When generating the indication signal in the OFDM system, the sparse subscriber mapper 111 serves to select a subcarrier to modulate data among all subcarriers and perform data mapping. The selected subcarrier is called an active subcarrier, and from the perspective of compressed sensing, the selected subcarrier is a support. In this instance, it is necessary to select a sparse number of active subcarriers to exploit compressed sensing, and it is important to select a subcarrier point that is advantageous for recovery performance in consideration of channel information and the property of a sensing matrix. The sparse minislot indication signal made through the sparse subscriber mapper 111 may be transmitted via the channel and the terminal 120 may receive the transmitted signal.

According to an embodiment, when the base station 110 selects the active subcarrier through the sparse subscriber mapper 111, channel information and sensing matrix may be taken into consideration. In general, the performance of compressed sensing varies depending on sparsity, support and signal intensity, and the base station may consider it in the process of selecting the subcarrier to modulate. Particularly, the proposed method makes use of an advantage of channel information acquisition using channel reciprocity in TDD communications in the method of constituting the support in given sparsity. Due to channel reciprocity where in the case of TDD communications, downlink and uplink share the same channel (frequency), information acquired by the base station through uplink channel estimation can be immediately used to transmit downlink data. When the OFDM symbol passes through the channel, the OFDM symbol suffers different channel attenuations of each subcarrier depending on a given channel environment. When there is a deep fading period, losses of data carried on the subcarrier are high, which makes signal recovery impossible. Accordingly, the first consideration to take when the sparse subscriber mapper 111 selects the active subcarrier is that it is necessary to select a subcarrier having a high channel gain corresponding to a frequency range of a subcarrier to select. The base station selects a point of a large channel size based on uplink channel information using the above-described channel reciprocity, thereby preventing information losses caused by deep fading. Additionally, in the sensing matrix U used for the terminal to recover as described below, the orthogonal column vector exists at each predetermined distance. In general, in compressed sensing, it is widely known that if a received signal is constituted from an orthogonal column vector column of the sensing matrix, recovery performance is good. Accordingly, the second consideration to take is that an index of a subcarrier to select is selected from a set of indexes corresponding to an orthogonal column vector in the sensing matrix.

An algorithm in which the sparse subscriber mapper 111 selects the active subcarrier or constitutes the support by combining the above-described two considerations is as in the following <Table 1>. <Table 1> describes the algorithm in which the sparse subscriber mapper 111 of the base station 110 selects the active subcarrier.

TABLE 1

Algorithm 1 Sparse Subcarrier Selection

Input: $h \in \mathbf{C}^n$, $U \in \mathbf{C}^{m \times n}$, $S \in \mathbf{N}$
Initialization: $\zeta = \emptyset$ 1: $i_{max} = \arg\max_i |h|_1$ 2: $\zeta = \{j \in \Sigma | \mu(j, i_{max}) = 0\} \cup \{i_{max}\}$ 3: $\Omega = \arg\max_{\Omega \subseteq \zeta, |\Omega|=S} |h_\Omega|_1$ Output: $\Omega$ Referring to <Table 1>, first, an index corresponding to a point having a largest channel size is set as imax based on the channel information acquired by the base station 110 via uplink channel estimation. Subsequently, in the sensing matrix, a set of indexes $\zeta$ of a column vector having an orthogonal relationship with a column vector corresponding to imax is generated. Finally, active subcarriers as much as sparsity S are selected in a descending order of channel size among channel sizes corresponding to the elements in $\zeta$, and a set of the selected elements is $\Omega$. Sparsity refers to the number of non-zero elements in the vector. That is, when the number of non-zero elements in the signal vector is S, the sparsity of the signal vector is S. A set of non-zero elements in the vector is referred to as a support. Accordingly, the support of the generated minislot indication signal is $\Omega$.

According to an embodiment of the present disclosure, referring to FIG. 4, the terminal 120 receives the sparse minislot indication signal generated by the base station 110 and transmitted in the TX path, and to recover the received sparse signal, the terminal 120 may further include a compressive sensing (CS) recovery module 124 in the RX path. For example, the terminal 120 may include at least one processor, and the function of the CS recovery module 124 may be performed by the at least one processor.

When the terminal 120 receives the minislot indication signal from the base station 110 via the channel, not all signals, but only a very small number of measurements is received, and signal recovery is performed by the CS recovery module 124. As signal recovery is performed using only a small number of measurements, latency occurring while receiving all signals may be reduced, which may affect a reduction in the total processing time.

According to an embodiment, the CS recovery module 124 recovers the received signal using the compressed sensing technique. When the indication signal received by the terminal 120 is y, y may be defined as the following <Equation 1>.

$$y = \Psi H F^H x + w \quad \text{[Equation 1]}$$

In <Equation 1>, y denotes the signal received by the terminal 120, $\Psi$ denotes a matrix that make measurements, H denotes a channel matrix, $F^H$ denotes an IDFT matrix, w denotes a noise vector that follows the Gussian distribution, and x denotes the original indication signal.

Using the relationship $H = F \Lambda F^H$ in the OFDM system, <Equation 2> is derived from <Equation 1> and defined as <Equation 3> and <Equation 4>.

$$y = \Psi F^H \Lambda x + w \quad \text{[Equation 2]}$$

$$U = \Psi F^H \quad \text{[Equation 3]}$$

$$v = \Lambda x \quad \text{[Equation 4]}$$

In <Equation 2>, y denotes the signal received by the terminal 120, $\Psi$ denotes a matrix that makes measurements, $F^H$ denotes an IDFT matrix, w denotes a noise vector that follows the Gaussian distribution, $\Lambda$ denotes channel information, and x denotes the original indication signal. In <Equation 3>, U denotes the sensing matrix. Referring to <Equation 2> to <Equation 4>, compressed sensing recovery performed by the terminal 120 is a process that recovers v via the given y and the sensing matrix U, and finally, estimates the signal x based on the channel information $\Lambda$.

The terminal 120 uses the compressed sensing technique to recover the minislot indication signal from the small number of received measurements. For example, the compressed sensing algorithm may be orthogonal matching pursuit.

According to an embodiment, the signal recovery process of the terminal 120 may include support recovery and sparse vector estimation. The support recovery is used to identify the terminal, and sparse vector estimation is performed to acquire allocation information of the instant minislot. According to the above-described algorithm in which the base station 110 constitutes the support, the base station 110 knows each terminal and the channel status, and the support varies depending on the channel, and thus the active subcarrier selected by the base station 110 changes for each terminal. That is, in case that the terminal 120 recovers an active subcarrier (support) used when allocating an instant minislot for a specific terminal, the terminal 120 can know if the instant minislot is allocated to the terminal 120. After determining the fact that the instant minislot is allocated to the terminal 120, the terminal 120 may acquire instant minislot allocation information via symbol detection.

The algorithm of constituting the support and recovery via compressed sensing is described in detail through the TX path of the base station 110 and the RX path of the terminal 120. Hereinafter, a whole flow of operations in which the base station 110 allocates the minislot and performs signaling, and the terminal 120 recovers the received signal is shown in FIGS. 5 and 6.

Figure 5:
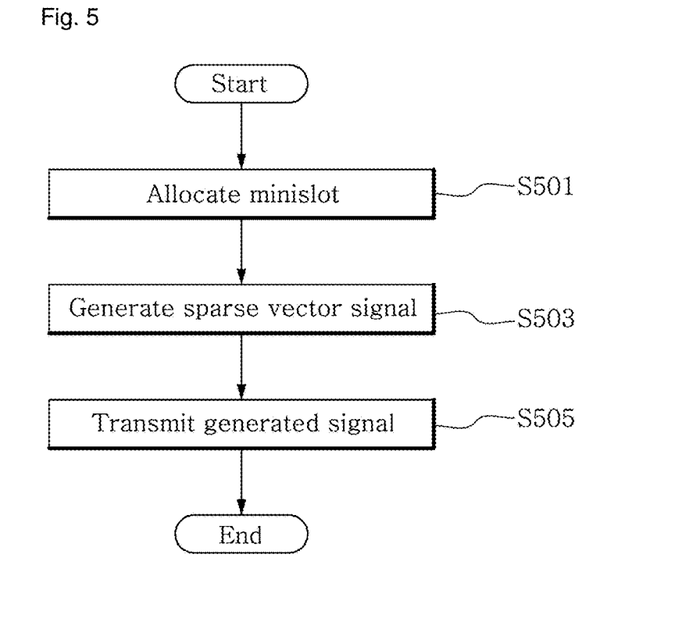
FIG. 5 shows a process of operation of a base station that generates and transmits a sparse vector signal according to an embodiment of the present disclosure.
Figure 6:
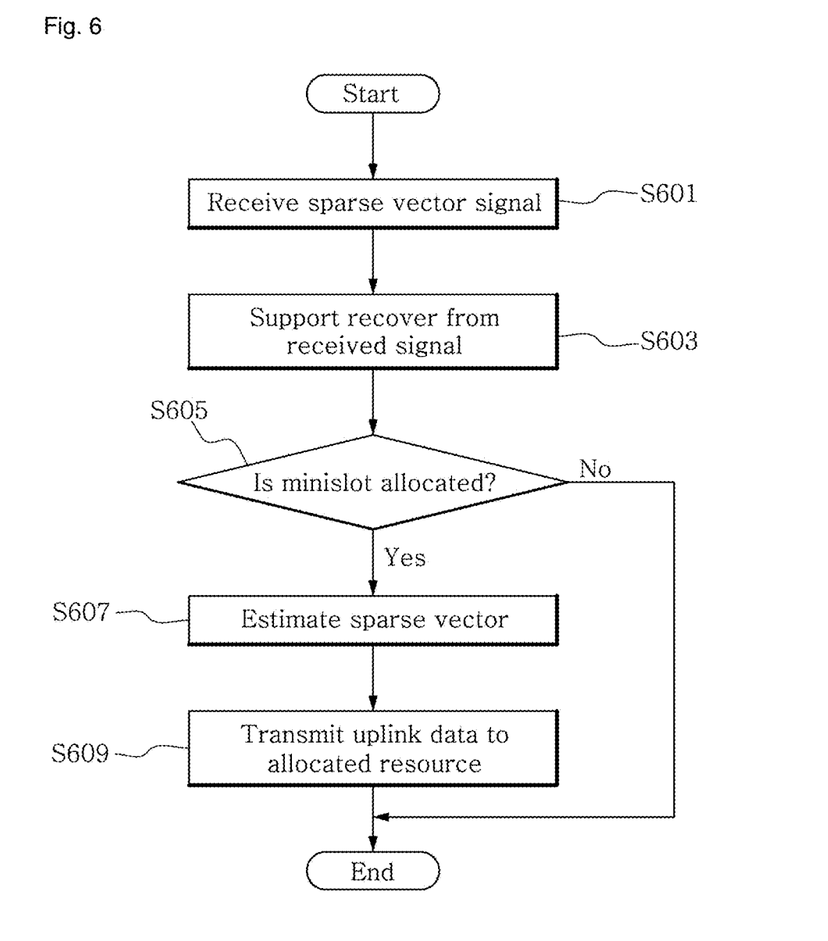
FIG. 6 shows a process of operation of a terminal that recovers a received signal according to an embodiment of the present disclosure.

FIG. 5 shows a process of operation of the base station 110 that generates and transmits a sparse vector signal according to an embodiment of the present disclosure.

Referring to FIG. 5, an embodiment in which the base station 110 generates and transmits a sparse vector signal includes the step of allocating a minislot (S501), the step of generating a sparse vector signal (S503), and the step of transmitting the generated signal (S505).

First, the base station 110 allocates a minislot (S501). The base station 110 allocates an instant minislot period for transmission of a small amount of urgent uplink data in a downlink period to prevent uplink transmission latency in downlink.

Subsequently, the base station 110 generates a sparse vector signal (S503). According to an embodiment of the present disclosure, the base station 110 selects an active subcarrier in consideration of channel status to enable the terminal to perform signal recovery using compressed sensing. For example, the base station 110 may select an active subcarrier as much as sparsity S in a descending order of channel size to constitute a support as in <Table 1>. In this instance, selecting a subcarrier having a high channel gain may minimize information losses caused by deep fading. As the channel status differs in each terminal, the active subcarrier may indicate a terminal allocated with a minislot. The base station 110 generates a sparse vector signal including the selected active subcarrier and the allocated resource information.

Finally, the base station 110 transmits the generated signal to the terminal 120 (S505). According to an embodiment, the base station 110 may transmit the generated signal to multiple terminals by a broadcast method. According to another embodiment, the base station 110 may only transmit the generated signal to a target terminal by a unicast method.

FIG. 6 shows a process in which the terminal 120 recovers a received signal according to an embodiment of the present disclosure.

Referring to FIG. 6, an embodiment in which the terminal 120 recovers a received signal includes the step of receiving, by the terminal 120, a sparse vector signal (S601), the step of performing support recovery from the received signal (S603), the step of determining if a minislot is allocated (S605), the step of performing sparse vector estimation (S607), and the step of transmitting uplink data to the allocated resource (S609).

First, the terminal 120 receives a sparse vector signal from the base station 110 (S601). In other words, the terminal 120 receives the sparse vector vector signal transmitted by the base station 110 via downlink. According to an embodiment, the sparse vector signal may be a minislot indication signal.

Subsequently, the terminal 120 may perform support recovery from the received signal (S603). According to an embodiment of the present disclosure, the terminal may recover the received signal by the compressed sensing technique, and may perform signal recovery using some measurements, not all signals. In this instance, the terminal 120 may receive a very small number of measurements and recover the signal. According to an embodiment, referring to <Equation 2> to <Equation 4>, the support recovery performed by the terminal 120 may be a process that recovers v through the given y and the sensing matrix U.

Subsequently, the terminal 120 determines if a minislot is allocated to the terminal 120 (S605). According to an embodiment of the present disclosure, the base station 110 knows each terminal and channel status, and an active subcarrier selected by the base station 110 differs in each terminal. In case that the terminal 120 recovers an active subcarrier (support) used when allocating an instant minislot for a specific terminal, the terminal 120 may determine if a minislot is allocated to the terminal 120. When it is determined that a minislot is allocated to the terminal 120, the terminal 120 performs sparse vector estimation (S607). When it is determined that a minislot is not allocated to the terminal 120, the terminal 120 terminates the signal recovery process.

When a minislot is allocated to the terminal 120, the terminal 120 performs sparse vector estimation (S607). According to an embodiment of the present disclosure, referring to <Equation 2> to <Equation 4>, the terminal 120 may recover v via support recovery, and finally, estimate the signal x based on the channel information Λ. The terminal 120 may recover the original signal via sparse vector estimation, and acquire instant minislot allocation information.

Finally, the terminal 120 transmits uplink data to the allocated resource (S609). According to an embodiment of the present disclosure, the terminal 120 may identify resource allocation information through the recovered signal, and transmit uplink data to the base station 110 using the allocated resource. Through this, the terminal 120 does not wait for the start point of the uplink period, and transmits urgent uplink data, thereby significantly reducing uplink data transmission latency.

In the above-described particular embodiments, the elements included in the present disclosure are represented in singular or plural form according to the presented particular embodiments. However, for convenience of description, the singular or plural form is suitably selected in the presented context, and the above-described embodiments are not limited to single or multiple elements, and a certain element represented in plural form may be a single element, and a certain element represented in singular form may be multiple elements.

While particular embodiments of the present disclosure have been described, it is obvious that many modifications may be made thereto without departing from the scope of technical spirit set forth in various embodiments. Therefore, the present disclosure should not be construed as limited to the disclosed embodiments, and should be defined by the appended claims and their equivalents.

The invention claimed is:

1. An operation method of a base station in a time division duplex system, the method comprising:
   setting a time period for uplink transmission of a terminal in a downlink period;
   generating a sparse vector signal including information of the time period; and transmitting the sparse vector signal to the terminal,
   wherein generating the sparse vector signal comprises:
   selecting at least one subcarrier based on channel information; and
   generating the sparse vector signal including information of the selected subcarrier.

2. The method according to claim 1, wherein selecting the subcarrier comprises:
   selecting the subcarrier as much as sparsity based on the channel information acquired via uplink channel estimation.

3. The method according to claim 2, wherein selecting the subcarrier as much as the sparsity comprises:
   determining an index of a subcarrier having a highest channel gain;
   generating a set of indexes of a column vector having an orthogonal relationship with a column vector corresponding to the index in a sensing matrix; and
   selecting the subcarrier as much as the sparsity in a descending order of channel gain from the set to constitute a support.

4. The method according to claim 1, wherein the selected subcarrier indicates the terminal allocated for uplink transmission in the time period.

5. An operation method of a terminal in a time division duplex system, the method comprising:
   receiving part of a sparse vector signal from a base station;
   recovering the received sparse vector signal by compressed sensing; and
   transmitting uplink data in an indicated time period within a downlink period based on the recovered signal,
   wherein recovering by the compressed sensing comprises:
   a support recovering step of recovering the received sparse vector signal using a sensing matrix; and
   a sparse vector estimation step of recovering the support recovered signal based on channel information, wherein the terminal determines if the time period is allocated to the terminal based on the support recovery.

6. The method according to claim 5, wherein the support recovered signal indicates at least one subcarrier selected by the base station, and the terminal determines if the time period is allocated to the terminal based on the indicated subcarrier.

7. A base station device in a time division duplex system, the base station device comprising:

at least one processor to set a time period for uplink transmission of a terminal in a downlink period, and generate a sparse vector signal including information of the time period; and a transceiver to transmit the sparse vector signal, wherein the at least one processor selects at least one subcarrier based on channel information, and generates the sparse vector signal including information of the selected subcarrier.

8. The base station device according to claim 7, wherein the at least one processor selects the subcarrier as much as sparsity based on the channel information acquired via uplink channel estimation.

9. The base station device according to claim 8, wherein the at least one processor determines an index of a subcarrier having a highest channel gain, generates a set of indexes of a column vector having an orthogonal relationship with a column vector corresponding to the index in a sensing matrix, and selects the subcarrier as much as the sparsity in a descending order of channel gain from the set to constitute a support.

10. The base station device according to claim 7, wherein the selected subcarrier indicates the terminal allocated for uplink transmission in the time period.

11. A terminal device in a time division duplex system, the terminal device comprising:

a transceiver to receive part of a sparse vector signal from a base station; and at least one processor to recover the received sparse vector signal by compressed sensing, wherein the transceiver transmits uplink data in an indicated time period within a downlink period based on the recovered signal, wherein the at least one processor performs support recovery to recover the received sparse vector signal using a sensing matrix, and performs sparse vector estimation to recover the support recovered signal based on channel information, wherein the at least one processor determines if the time period is allocated to the terminal based on the support recovery.

12. The terminal device according to claim 11, wherein the support recovered signal indicates at least one subcarrier selected by the base station, and the at least one processor determines if the time period is allocated to the terminal based on the indicated subcarrier.

* * * * *